No. 638,980. Patented Dec. 12, 1899.
J. McGINLEY.
AUTOMATIC OILER.
(Application filed Sept. 16, 1897. Renewed Oct. 2, 1899.)
(No Model.)
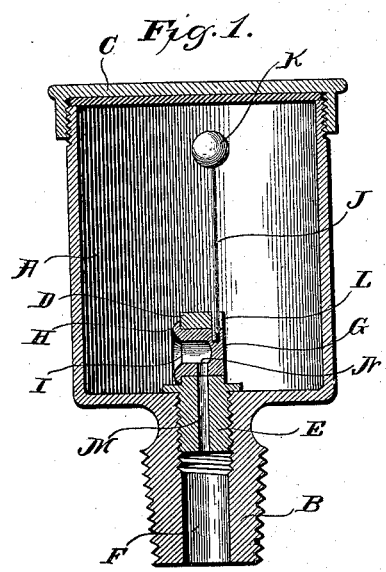
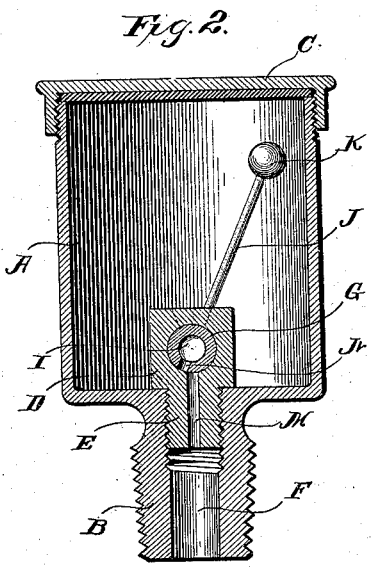
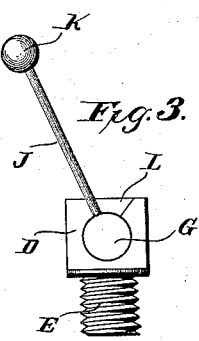
Witnesses
Inventor
James McGinley
by
Attorney

UNITED STATES PATENT OFFICE.

JAMES McGINLEY, OF KINGSTON, PENNSYLVANIA.

AUTOMATIC OILER.

SPECIFICATION forming part of Letters Patent No. 638,980, dated December 12, 1899.

Application filed September 16, 1897. Renewed October 2, 1899. Serial No. 732,421. (No model.)

*To all whom it may concern:*

Be it known that I, JAMES McGINLEY, a citizen of the United States, residing at Kingston, in the county of Luzerne and State of Pennsylvania, have invented a certain new and useful Improvement in Automatic Oilers, of which the following is a specification.

My invention relates to a new and useful improvement in automatic oilers, and has for its object to provide such a device which will deliver to the bearing to be oiled a given quantity of lubricant upon each revolution or oscillation of said bearing.

A further object of this invention is to provide for atmospheric pressure being exerted upon the top of the oil when passing through the valve, so that said oil will not become choked in the delivery-tube, and thereby be prevented from reaching the bearing.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a central vertical section of an oil-cup having my improvement applied thereto; Fig. 2, a similar view taken at right angles to Fig. 1, and Fig. 3 a detail elevation of the valve-post and pendulum.

In carrying out my invention as here embodied, A represents an oil-cup of any suitable design having formed therewith the shank B, which is threaded for securement in a suitable hole formed in the bearing to be lubricated, and this cup has threaded upon its upper end the cap C, whereby it may be filled and when so filled the contents thereof retained. The post D is provided with a threaded shank E, which is run within the upper portion of the passage F, formed in the shank B, and this post has an opening formed therethrough of sufficient size to receive the valve G, said valve consisting of a cylindrical plug having a flange H formed thereon and a cavity I formed therein. This plug is fitted within the opening so that the flange H bears against one surface of the post and is held in this position by the pendulum-wire J, which is threaded in a suitable hole, as clearly shown in Fig. 1. The upper end of the pendulum-wire is provided with a pendulum-weight K, and the movements thereof are limited by the walls of the cut-away portion L of the post. A small hole M leads from the valve-opening in the post downward through the shank E, communicating with the passage F, and the valve has formed therein a hole N, which when said valve is in one position registers with the hole M, and when it is in the opposite position this hole N passes out of alinement with the hole M, thereby closing the latter, as will be readily understood by reference to Fig. 2.

From this description it is obvious when my improved oiler is properly placed upon a reciprocating member of a machine, such as the cross-head of an engine, the pendulum will be caused to swing to and fro by the to-and-fro movements of the cross-head and when so swinging will open and close the valve, thus permitting the intermittent flow of oil through the hole M to the passage F, from whence it will reach the bearing. So long as the cup is supplied with oil the cavity I will be completely filled therewith, and the pressure of the oil within the cup will tend to facilitate the downward flowing of a certain portion thereof through the valve when the latter is open, and as the atmospheric pressure within the cup will be exerted upon the oil within the hole M when the valve is open it will be seen that the feeding thereof will be positive and no liability of the oil choking within the hole M or passage F will be had.

Having thus fully described this invention, what is claimed as new and useful is—

1. In combination with an oil-cup of the character described, a post secured in the shank of said cup, said post having a longitudinal passage, a transverse opening leading to said passage, and a slot extending upward from said opening, a plug-valve fitted in the transverse opening, said plug-valve having a cavity in its end with a hole leading through the bottom wall adapted to register at certain times with the passage through post, a pendulum-rod secured to the plug-valve and extending upward through said slot, and a weight on the upper end of said rod, substantially as set forth.

2. In combination with an oil-cup of the character described, a post secured in the shank of said cup, said post having a longitudinal passage therethrough, a transverse opening leading to said passage, and a slot extending upward from said opening, a plug-valve fitted in the transverse opening, said plug-valve having its outer end flanged to bear against the surface of the post, and also having a cavity in said end, with a hole leading through the bottom wall, which is adapted to register at certain times with the passage in the post, a pendulum-rod secured to the plug-valve and extending upward through the slot and a weight on the upper end of said rod, substantially as set forth.

In testimony whereof I have hereunto affixed my signature in the presence of two subscribing witnesses.

JAMES McGINLEY.

Witnesses:
S. S. WILLIAMSON,
SAMUEL L. TAYLOR.